US008910777B2

(12) United States Patent
Minkin

(10) Patent No.: US 8,910,777 B2
(45) Date of Patent: Dec. 16, 2014

(54) ARRANGEMENT FOR MONITORING A CONVEYOR SYSTEM TO DETECT DAMAGE TO THE CONVEYOR BELT THEREOF

(71) Applicant: ContiTech Transportbandsysteme GmbH, Hannover (DE)

(72) Inventor: Andrey Minkin, Northeim (DE)

(73) Assignee: ContiTech Transportbandsysteme GmbH, Hannover (DE)

( * ) Notice: Subject to any disclaimer, the term of this patent is extended or adjusted under 35 U.S.C. 154(b) by 0 days.

(21) Appl. No.: 14/158,284

(22) Filed: Jan. 17, 2014

(65) Prior Publication Data

US 2014/0131176 A1   May 15, 2014

Related U.S. Application Data

(63) Continuation of application No. PCT/EP2012/061412, filed on Jun. 15, 2012.

(30) Foreign Application Priority Data

Jul. 19, 2011   (DE) .................... 10 2011 051 923

(51) Int. Cl.
 *B65G 43/02* (2006.01)
 *B65G 15/36* (2006.01)
(52) U.S. Cl.
 CPC ............... *B65G 43/02* (2013.01); *B65G 15/36* (2013.01); *B65G 2203/0275* (2013.01)
 USPC ..................... 198/810.02; 198/847
(58) Field of Classification Search
 CPC ........ B65G 43/02; B65G 43/06; B65G 15/34; B65G 15/36; B65G 2203/0275
 USPC ................................... 198/810.02
 See application file for complete search history.

(56) References Cited

U.S. PATENT DOCUMENTS 3,651,506 A    3/1972 Olaf et al.
3,731,113 A *  5/1973 Lowe et al. ............. 198/810.02
(Continued)

FOREIGN PATENT DOCUMENTS

DE    24 13 543 A1   10/1975
DE    25 20 943 A1   11/1976
(Continued)

OTHER PUBLICATIONS

International Search Report dated Sep. 3, 2012 of international application PCT/EP2012/061412 on which this application is based.

*Primary Examiner* — Mark A Deuble
(74) *Attorney, Agent, or Firm* — Walter Ottesen P.A.

(57) ABSTRACT

An arrangement continuously and non-destructively monitors a conveyor system having a continuous conveyor belt with a carrying-side cover plate and a running-side cover plate, each made of a polymeric material with elastic properties. The arrangement further includes drums wherein the above-mentioned components form, in conjunction with the conveyor belt, a material-conveying top strand (A) and a material-conveying or material-free bottom strand (B). A conductor loop packet with continuous conductor loops is embedded in the conveyor belt. An electronic slit protection system contactlessly detects damage to the conveyor belt. The slit protection system is an electrical system including an interrogation station and a slit monitoring station and is connected to a central controller which controls the entire conveyor system. The arrangement is equipped, as part of a conductor loop packet, with sequential conductor loops and a sequential slit protection system.

11 Claims, 2 Drawing Sheets

(56) References Cited

U.S. PATENT DOCUMENTS

| | | | |
|---|---|---|---|
| 3,742,477 A * | 6/1973 | Enabnit | 198/810.02 |
| 3,834,518 A * | 9/1974 | Specht et al. | 198/810.02 |
| 3,834,524 A * | 9/1974 | Ratz et al. | 198/810.02 |
| 4,621,727 A | 11/1986 | Strader | |
| 5,460,261 A | 10/1995 | Kuesel et al. | |
| 5,609,242 A | 3/1997 | Hutchins et al. | |
| 6,356,201 B1 | 3/2002 | Alles | |
| 6,581,755 B1 | 6/2003 | Wilke et al. | |
| 6,702,103 B1 | 3/2004 | Kuesel | |
| 6,715,602 B1 * | 4/2004 | Gartland | 198/810.02 |
| 6,781,515 B2 | 8/2004 | Kuzik et al. | |
| 6,831,566 B1 | 12/2004 | Kuesel | |
| 7,178,663 B2 | 2/2007 | Schnell | |
| 7,259,854 B2 | 8/2007 | Schnell | |
| 8,149,989 B2 | 4/2012 | Schnell | |
| 8,662,290 B2 * | 3/2014 | Twigger et al. | 198/810.01 |
| 2003/0000808 A1 | 1/2003 | Kusel | |
| 2012/0012444 A1 | 1/2012 | Kuesel | |

FOREIGN PATENT DOCUMENTS

| | | |
|---|---|---|
| DE | 25 32 190 A1 | 1/1977 |
| DE | 35 17 314 A1 | 1/1986 |
| DE | 36 06 129 A1 | 8/1986 |
| DE | 36 12 765 A1 | 10/1987 |
| DE | 38 01 120 A1 | 7/1989 |
| DE | 38 11 533 A1 | 10/1989 |
| DE | 40 14 475 A1 | 10/1990 |
| DE | 40 13 764 A1 | 12/1990 |
| DE | 39 27 746 A1 | 2/1991 |
| DE | 40 12 906 A1 | 10/1991 |
| DE | 42 40 094 A1 | 6/1994 |
| DE | 44 36 042 A1 | 4/1996 |
| DE | 44 44 264 C1 | 4/1996 |
| DE | 195 39 980 A1 | 4/1997 |
| DE | 197 15 703 A1 | 10/1998 |
| DE | 199 02 508 A1 | 8/2000 |
| DE | 199 21 224 A1 | 11/2000 |
| DE | 101 00 249 A1 | 7/2001 |
| DE | 101 29 091 A1 | 5/2002 |
| DE | 101 40 920 A1 | 5/2002 |
| DE | 10 2006 036 668 A1 | 2/2008 |
| DE | 10 2009 003 552 A1 | 9/2010 |
| DE | 10 2009 043 904 A1 | 3/2011 |
| EP | 0 336 385 A1 | 10/1989 |
| EP | 0 787 669 A2 | 8/1997 |
| EP | 1 283 182 A1 | 2/2003 |
| JP | 04-158208 | 6/1992 |
| JP | 2000-292371 A | 10/2000 |
| WO | WO 01/00512 A1 | 1/2001 |
| WO | WO 2008/031648 A1 | 3/2008 |
| WO | WO 2008/034483 A1 | 3/2008 |
| WO | WO 2010/033526 A1 | 3/2010 |

* cited by examiner

ARRANGEMENT FOR MONITORING A CONVEYOR SYSTEM TO DETECT DAMAGE TO THE CONVEYOR BELT THEREOF

CROSS REFERENCE TO RELATED APPLICATIONS

This application is a continuation application of international patent application PCT/EP2012/061412, filed Jun. 15, 2012, designating the United States and claiming priority from German application 10 2011 051 923.8, filed Jul. 19, 2011, and the entire content of both applications is incorporated herein by reference.

FIELD OF THE INVENTION

The invention relates to an arrangement for the continuous and non-destructive monitoring of a conveyor system having the following components: a continuous conveyor belt with a carrying-side cover plate and a running-side cover plate, each being made of a polymer material with elastic properties, and with an embedded reinforcement; drums, carrying rollers and carrying frames, wherein the above-mentioned components form, in conjunction with the conveyor belt, a material-conveying top strand with a supply location and a discharge location for the conveyed material and a material-conveying or material-free bottom strand; a conductor loop packet with continuous conductor loops which is embedded in the conveyor belt; and, an electronic slit protection system for contactlessly detecting damage to the conveyor belt, wherein the slit protection system is an electrical device system which comprises at least one interrogation station and at least one slit monitoring station which are connected to a central controller controlling the entire conveyor system.

BACKGROUND OF THE INVENTION

In relation to the structure of a conveyor belt, reference is made in particular to the following patent literature:

| | |
|---|---|
| DE 25 20 943 A1 | DE 38 01 120 A1 |
| DE 25 32 190 A1 | U.S. Pat. No. 5,460,261 |
| DE 44 36 042 A1 | U.S. Pat. No. 5,609,242 |
| EP 0 336 385 A1 | WO 2008/034483 A1 |

The carrying-side cover plate and the running-side cover plate normally each comprise a rubber mixture containing a rubber component or a rubber component blend, a wetting agent or a wetting system, comprising a wetting agent and an accelerator, and also normally further mixing ingredients, in particular a filler and/or a processing aid and/or an aging prevention aid and/or a plasticizer and/or other additives (for example, fibers, colored pigments). The relevant rubber basis is in particular:
natural rubber (NR)
butadiene rubber (BR)
chloroprene rubber (CR)
styrene-butadiene rubber (SBR)
nitrile rubber (NBR)
butyl rubber (IIR)
ethylene-propylene rubber (EPM)
ethylene-propylene-diene rubber (EPDM)
SBR/NR blend
SBR/BR blend
NR/BR blend Of particular importance hitherto has been CR, which is distinguished by high resistance to flames, weathering and aging, in particular for conveyor belts with use in underground mining. Furthermore, NR and the aforementioned blends (DE 10 2009 043 904 A1) have gained greater importance in open-cast mining.

As a result of the vulcanization of a rubber mixture of the aforementioned type, the conveyor belt acquires the required elastic properties.

The embedded tension members used which run in the longitudinal direction of the conveyor belt are cords made of steel or aramid, cords made of steel being of particular importance. In particular, in conjunction with steel cord conveyor belts, for the purpose of slit protection, an embedded transverse reinforcement made of synthetic cords, for example of polyamide, is additionally used (WO 2008/034483 A1). The tension members can also be a two-dimensional textile structure, in particular a single-layer or multilayer fabric, for example, a polyester-polyamide fabric.

Normally, the guidance of a conveyor belt in a conveyor system is carried out in open form, specifically within the context of a hollowed carrier roller frame.

In the last 20 years, however, the closed conveyor system using a tubular conveyor belt has also been developed further. The system components in the closed conveyor system, in addition to the drums (drive drum, reversing drum), carrier rollers and carrying frames, are normally also correction rollers and a hold-down roller when the conveyor belt is closed. In this connection, reference is made in particular to the following patent literature:

| | |
|---|---|
| DE 36 06 129 A1 | DE 10 2009 003 552 A1 |
| DE 36 12 765 A1 | EP 0 336 385 A1 |
| U.S. Pat. No. 5,460,261 | |

Further components of a conveyor system can be a supply chute, discharge chute, deflection drums and chute seals made of a polymer material.

When they are charged with the conveyed material, for example ores, conveyor belts are highly stressed. As a result, damage to the carrying-side cover plate of the conveyor belt often occurs, specifically in the form of cuts, material breakouts or other damage. These are critical to the service life of the conveyor belt and must therefore be detected as early as possible. Wear phenomena as a result of abrasion can also occur in the running-side cover plate with contact with the drums and carrier rollers and possibly with further roller components which are mentioned above. Furthermore, in the case of a steel cord conveyor belt, the running-side cover plate can be slit by the steel cords under extreme loadings, the synthetic cord transverse reinforcement already mentioned offering adequate slit protection—although not always. Finally, the tension members can also be damaged during continuous operation, which can have a detrimental effect on the pulling power of a conveyor belt.

In addition to regular visual inspection, there are various systems for monitoring the condition of the conveyor belt during the operation of a conveyor system. An outline of the relevant prior art is set forth below:

(a) The documents DE 44 44 264 C1, DE 197 15 703 B1, US 2012/0012444, U.S. Pat. No. 6,781,515, U.S. Pat. No. 7,178,663 and U.S. Pat. No. 4,621,727 describe an approach in which the conveyor belts are provided with conductor loops at regular intervals, the damage to which can be detected by electro-inductive measuring methods. Transponders can also be employed instead of the conductor loops or in combination with the latter. The significant conductor loop technology and the problems associated therewith will be discussed in more detail at another point.

(b) DE 195 39 980 A1 and EP 0 787 669 B1 describe a monitoring device using monitoring elements and identification elements which are incorporated into the conveyor belt transversely with respect to the conveying direction and which, as they are led past stationary reading devices, report both the condition and also the position. However, this monitoring concept is very complicated to implement.

(c) U.S. Pat. No. 6,356,201 presents a system for monitoring a layer subjected to wear. For instance, a ferromagnetic layer is embedded in the carrying-side cover plate and/or running-side cover plate and shields the signal from a transporter located underneath unless this layer has been damaged. This monitoring concept is also very complicated and can be applied only to specifically equipped conveyor belts.

(d) Monitoring the condition of the steel cords in conveyor belts is carried out by means of an inductive field that is led past externally (DE 199 21 224 A1) or by means of a magnetic field (DE 10 2006 036 668 A1). The disadvantage is that only damage to the steel cord structures can be registered hereby.

(e) When monitoring the damage to the carrying-side cover plate and/or running-side cover plate, use is made of opto-electronic systems, in particular in the form of a line or surface camera. In this connection, reference can be made in particular to the following patent publications:

| | |
|---|---|
| DE 24 13 543 A1 | DE 101 29 091 A1 |
| DE 42 40 094 A1 | DE 101 40 920 A1 |
| U.S. Pat. No. 6,702,103 | EP 1 187 781 B1 |
| U.S. Pat. No. 6,831,566 | U.S. Pat. No. 7,259,854 |
| US 2003/000808 | WO 2008/031648 A1 |

The comprehensive development work documented above underlines the increasing importance of this monitoring device. In addition to the great technical effort, however, this monitoring concept depends on a conveyor belt surface without significant contamination. For this reason, the opto-electronic system is additionally provided with an air-purge apparatus, but this indicates the limits of the efficiency.

(f) Also known is an apparatus for the non-destructive inspection of a conveyor belt via high-energy rays, in particular x-rays, reference being made in particular to the following patent publications in this connection:

| | |
|---|---|
| DE 35 17 314 A1 | JP 04158208 A (Patent Abstracts of Japan) |
| U.S. Pat. No. 8,149,989 | JP 2000292371 A (Patent Abstracts of Japan) |

The disadvantage is that, in the case of such rays, the monitoring system has to be integrated into a housing on safety grounds, which likewise indicates the limits of the efficiency.

Furthermore, in the case of this monitoring device, it is primarily the interior of a conveyor belt, in particular the embedded steel cords, that is registered.

The monitoring of a conveyor belt by means of a slit protection system using the conductor loops already mentioned has gained particular importance; in the following text, the previous slit protection technology will now be discussed in more detail.

A conductor loop or conductor loop packet is a packet which comprises one or more endlessly connected (short-circuited) loops (contours) of any desired form, for example in the form of a meander, rectilinear, rectangular or in the form of a figure 8. The contours can be produced from various materials and constructional elements, for example from a steel cord, a conductive textile thread or a conductive polymer. They are embedded in the polymer packet of the conveyor belt. The conductor loop or the conductor loop packet can be vulcanized into the cover plate of a conveyor belt on the carrying side and/or running side during the production of a conveyor belt or else subsequently, specifically normally at a distance of 50 to 200 m. A conductor loop functions in accordance with the principle of electromagnetic induction. With regard to conductor loop technology and the conductor loop form, reference is made in particular to the following patent publications:

| | |
|---|---|
| DE 38 11 533 A1 | DE 199 02 508 A1 |
| DE 39 27 746 A1 | DE 101 00 249 A1 |
| DE 40 12 906 A1 | U.S. Pat. No. 4,621,727 |
| DE 40 13 764 A1 | U.S. Pat. No. 7,178,663 |
| DE 40 14 475 A1 | US 2012/0012444 |

In the following two published applications, the conductor loop packet is described in particularly detailed form by using frequently used conductor loop forms:

In U.S. Pat. No. 4,621,727, the conductor loop is formed in the shape of a figure 8, specifically within the context of multiple turns.

In U.S. Pat. No. 7,178,663, a conductor loop packet is presented which comprises a first conductor loop. A second conductor loop is arranged inside this first conductor loop. If appropriate, a third conductor loop can be incorporated inside this second conductor loop.

The slit protection system is an electrical system which comprises at least one interrogation station, in particular in the form of a transmitter/receiver pair, at least one slit monitoring station, for example in the form of a scanner, and normally additionally at least one proximity initiator and/or at least one transponder, and functions in accordance with the principle described below.

During the operation of the conveying system, the conductor loops are interrogated by an interrogation station by means of a combination of a transmitter and a receiver and a slit monitoring station. When a conductor loop passes the interrogation station, an electromagnetic signal is transmitted from the transmitter to the receiver by means of an intact contour or contours. The transmitter generates an alternating magnetic field, which generates a current in the conductive short-circuited contours of a conductor loop. This current in turn generates a magnetic field, which is registered by the receiver, that is to say in accordance with the principle of electromagnetic induction. If the conveyor belt is slit in the conveying direction and thus the contour or contours of the conductor loop has or have been destroyed, no signal is transmitted from the transmitter to the receiver. The slit monitoring system sends a signal to the central controller of the conveyor system, in this case the conveyor belt being stopped. As a result, the extent of the damage also remains limited. The position of conductor loops is determined absolutely, irrespective of the conveyor belt speed and the conveyor belt running direction, and relative to the adjacent conductor loops with the aid of at least one proximity initiator which, for example, is located on a drum. There are also solutions for position determination on the basis of at least one transponder. The slit protection system is connected to the central controller of a conveyor system, which controls the entire conveyor system.

The main task of each conductor loop slit protection system consists primarily in stopping a conveyor system if a longitudinal slit or a great amount of conveyor belt damage in the conveying direction arises. Limited conveyor belt notches or perforations must not be the cause of, as a result, a damaged conductor loop becoming a reason for stopping a conveyor system.

Since the contours in a commercially available conductor loop packet, for example following the teaching according to U.S. Pat. No. 4,621,727 and U.S. Pat. No. 7,178,663, are located very close to one another, there is the danger that all the contours of the entire conductor loop package can fail as a result of a single local damage event. Consequently, in the case of such a packet construction, undesired plant stoppages and time losses are to be feared by the conveyor system operator.

SUMMARY OF THE INVENTION

Against the background of the aforementioned overall problems, it is an object of the invention to provide a generic arrangement for monitoring a conveyor system in which the service life of conductor loops is increased with the conveyor system being associated with a slit protection principle which minimizes the undesired conveyor system failures and the time losses associated therewith which are not caused by longitudinal slits.

The above object is achieved in that the conductor loop packet has at least two sequential conductor loops, which are arranged one after another at a distance in the longitudinal direction of the conveyor belt, wherein the slit monitoring station of a sequential slit protection system supplies a combination of a first signal for an intact conductor loop and a second signal for a destroyed or damaged conductor loop as a signal, wherein the sequential slit protection system operates in such a way that, in the event of destruction of or damage to a conductor loop, given at least one intact conductor loop within the conductor loop packet, a warning signal is supplied, associated with measures during the next repair and inspection operation, while, in the event of the destruction of or damage to all the conductor loops of the conductor loop packet, the conveyor belt is stopped.

In the following text, the functional logic of the sequential slit protection system will be explained in more detail by using a conductor loop packet having two or three sequential conductor loops.

The slit monitoring station, for example in the form of a scanner, supplies as a signal a combination of "0" or "1", wherein "1" signals an intact conductor loop and "0" signals a destroyed or damaged conductor loop. If all the conductor loops are undamaged, the slit monitoring station then supplies the signal "11" if there are two conductor loops or the signal "111" if there are three conductor loops. Then, if a conductor loop of a conductor loop packet has been torn or damaged, the slit monitoring system for a two-loop packet supplies a warning signal "10" or "01" and, for a three-loop packet, supplies a warning signal "101" or "011" or "110". Such a warning signal points to the fact that, during the next repair and inspection operation, this conductor loop packet or a part thereof should be replaced. However, the conveyor belt will be stopped only when the slit protection system supplies the warning signal "00" in the case of a two-loop packet and "000" in the case of a three-loop packet. As a result, the probability that two or three conductor loops in a conductor loop packet will fail simultaneously as a result of local conveyor belt damage will be very low. Consequently, undesired conveyor system failures and associated time losses which are not caused by longitudinal slits can be minimized.

An electronic slit protection system required for this purpose can be built up in a similar way to a commercially available slit protection system but differs in the functional logic described above.

The distance between two sequential conductor loops in a conductor loop packet should preferably be chosen such that it results in more than the maximum particle size $d_{Kmax}$ of the conveyed material. This distance is filled with a polymer material, for example a rubber mixture based on CR. However, this makes a sequential conductor loop only slightly more expensive as compared with a commercially available conductor loop. Depending on the conductor loop construction, the short-circuited contours can have different forms, for example in the form of meanders.

The maximum particle size $d_{Kmax}$ of a conveyed material in conveyor belt technology generally lies between 0 and 400 mm. Depending on the conveyor belt width (b) and the percentage particle size distribution, the maximum particle size must be no more than $d_{Kmax} \leq b/(3 \ldots 4)$. If, for example, the maximum conveyor belt width is assumed to be b=3200 mm, the maximum particle size should lie in the interval $$800 \text{ mm} \leq d_{Kmax} \leq 1067 \text{ mm}.$$

In this connection, reference is made to the following literature source: "Stetigförderer" [Continuous conveyors] by Pajer, Kuhnt and Kurth, 4th greatly revised edition, VEB Verlag Technik Berlin, 1983.

In the event of particularly high loading by the conveyed material, for example as a result of the impingement of large conveyed material lumps at the supply location in the case of systems with a short axial spacing, a conductor loop packet can be reinforced with transverse reinforcement if the cover plate thickness, in particular that of the cover plate on the carrying side, permits. Expediently, a two-dimensional textile structure, in particular in the form of a fabric, in particular once more in the form of a polyamide-polyester fabric, will be used here.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
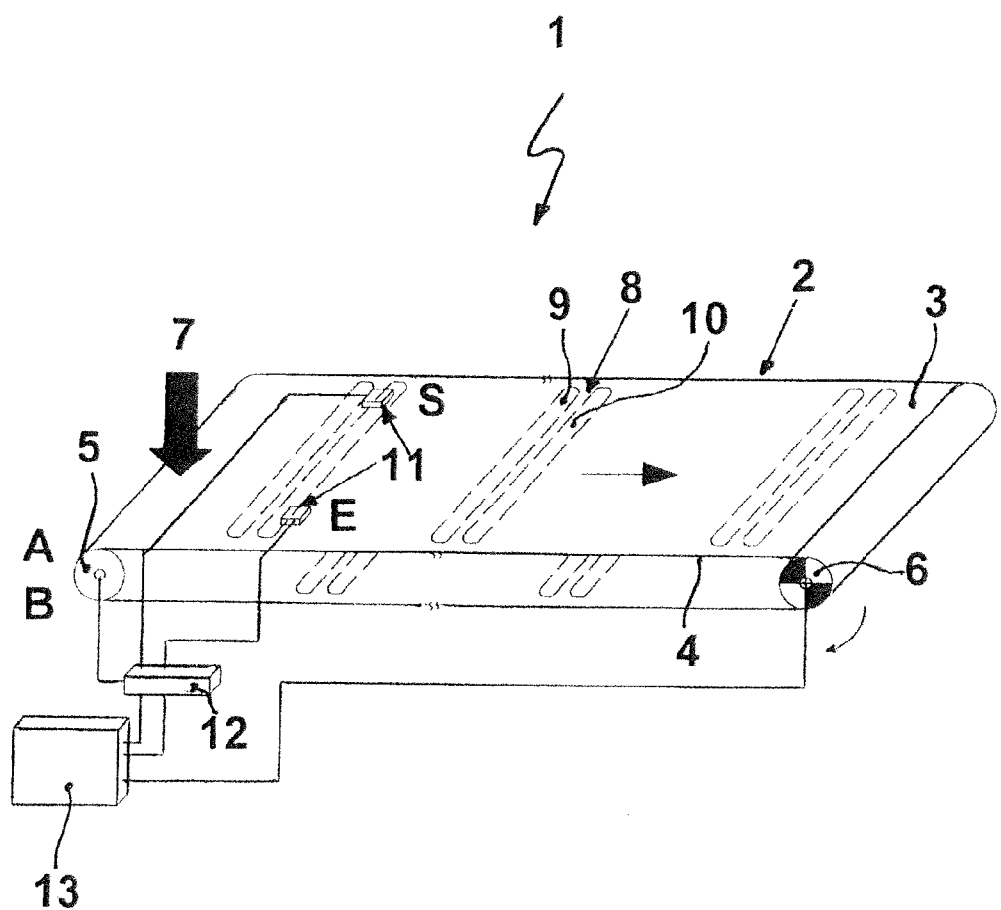
FIG. 1 is a schematic of a conveyor system having sequential conductor loops and a sequential slit protection system.

FIG. 1 shows a conveyor system 1 including a conveyor belt 2 comprising a carrying-side cover plate 3 and a running-side cover plate 4 with each being made of a polymer material with elastic properties, for example of a vulcanized rubber mixture based on CR, and also an embedded tension reinforcement, for example, in the form of steel cords.

In the running direction (arrow direction), the conveyor belt 2 is guided around the drums 5 and 6. The supply location 7 for the conveyed material is located in the immediate area of the drum 5. The drum 6 is where the conveyor belt 2 transfers from the top strand A to the bottom strand B. The drum 6 is simultaneously also the drum whereat the conveyed material is thrown off or discharged from the conveyor belt. As an alternative to this, the drum 5 can also perform the drive function. The cover plate 4 on the running side is supported on carrier rollers within the top strand A and the bottom strand B.

Figure 2:
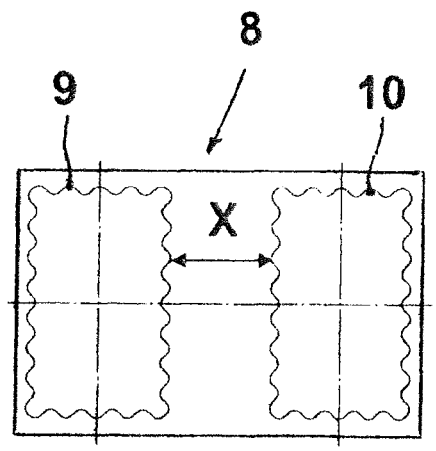
FIG. 2 shows a conductor loop packet having two sequential conductor loops; and, FIG. 3 shows a conductor loop packet having three sequential conductor loops.

A plurality of conductor loop packets 8 are embedded in the carrying-side cover plate 3 and/or the running-side cover plate 4, in particular within the cover plate on the carrying side. Each conductor loop packet comprises two continuous conductor loops 9 and 10, which are arranged one after another at a distance in the conveyor belt longitudinal direction. This two-loop packet will be explained in more detail in conjunction with FIG. 2.

The slit protection system comprises at least one interrogation station 11 in the form of a transmitter S/receiver E pair, a slit monitoring station 12 and a central controller 13 with an integrated process computer. A further component of the slit monitoring system is at least one proximity initiator and/or at least one transponder. The proximity initiator, the significance of which in conveyor systems is described in detail in particular in EP 1 283 182 A1, is located on the drum 5, for example. The transponder is embedded in the carrying-side cover plate 3 and/or the running-side cover plate 4 of the conveyor belt 2. In this connection, reference is made to the transponder technology described in EP 1 283 182 A1 which is incorporated herein by reference.

Within a conductor loop packet 8, the two conductor loops 9 and 10 operate sequentially, specifically encompassing a sequential slit protection system. The slit monitoring station 12 supplies as a signal a combination of "0" or "1", wherein "1" signals an intact conductor loop and "0" signals a destroyed or damaged conductor loop. If, for example, the slit monitoring station supplies the signal "11" for the two conductor loops 9 and 10, then both conductor loops are undamaged. If a conductor loop of a conductor loop packet has been torn or damaged, the slit protection system supplies a warning signal "10" or "01" which is associated with appropriate measures during the next repair and inspection operation. However, the conveyor belt 2 is stopped only when the system supplies the warning signal "00".

FIG. 2 again now shows the conductor loop packet 8 having the two sequential conductor loops 9 and 10. Within this two-loop packet, the two continuous conductor loops run in the form of a meander. In the conveyor belt longitudinal direction, the two conductor loops are arranged one after another at a distance X. This distance X is greater than the maximum particle size $d_{Kmax}$ of the conveyed material. With regard to the interval range of $d_{Kmax}$, reference is made to that already discussed above.

Figure 3:
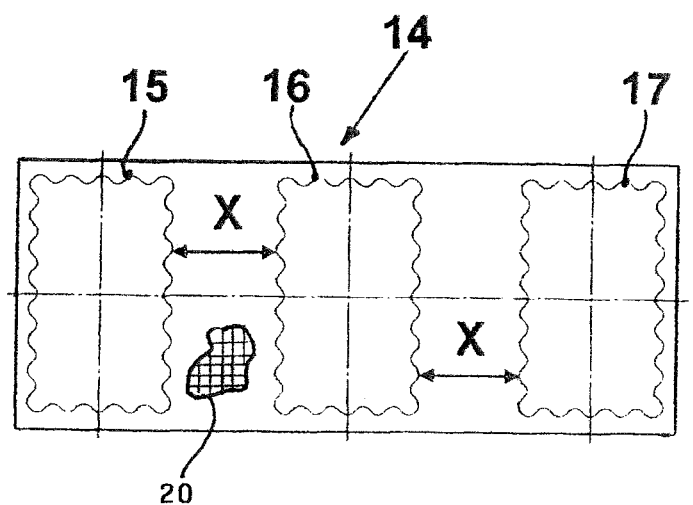

FIG. 3 now shows a conductor loop packet 14 having three sequential conductor loops 15, 16 and 17. Within this three-loop packet, the three continuous conductor loops likewise run in the form of a meander. In the conveyor belt longitudinal direction, each two conductor loops are arranged one after another at a distance X. The distance between the conductor loops 15 and 16 and between 16 and 17 is preferably the same. With regard to the distance parameters, the same applies here as in the case of the conductor loop packet 8 according to FIG. 2. However, the conveyor belt will be stopped only when the slit protection system supplies the warning signal "000" but not, for example, in the case of a warning signal "101".

As mentioned above, in the event of particularly high loading by the conveyed material, for example as a result of the impact of large lumps of the conveyed material at the supply location 7, a conductor loop packet can be reinforced with transverse reinforcement if the cover plate thickness, in particular that of the cover plate on the carrying side, permits. The transverse reinforcement is shown schematically in FIG. 3 at reference numeral 20.

The transverse reinforcement can be made of a textile material, for example, in the form of a two-dimensional textile structure. Also, the two-dimensional textile structure can be one of a woven, knitted, crocheted or nonwoven material.

It is understood that the foregoing description is that of the preferred embodiments of the invention and that various changes and modifications may be made thereto without departing from the spirit and scope of the invention as defined in the appended claims.

LIST OF REFERENCE CHARACTERS (Part of the Description)
1 Conveyor system
2 Conveyor belt
3 Carrying-side cover plate
4 Running-side cover plate
5 Drum
6 Drum
7 Supply location for the conveyed material
8 Conductor loop packet in the form of a two-loop packet
9 Conductor loop
10 Conductor loop
11 Interrogation station in the form of a transmitter/receiver pair
12 Slit monitoring station
13 Central controller
14 Conductor loop packet in the form of a three-loop packet
15 Conductor loop
16 Conductor loop
17 Conductor loop
20 Transverse reinforcement
A Top strand
B Bottom strand
E Receiver
S Transmitter
X Distance between two conductor loops

What is claimed is:

1. An arrangement for continuously and destructive-free monitoring a conveyor system, the conveyor system including:
   a continuous closed conveyor belt having a carrying-side cover plate and a running-side cover plate;
   said cover plates each being made of a polymer material having elastic characteristics;
   said conveyor belt defining a longitudinal direction and having a tension member embedded therein;
   first and second drums for moving said conveyor belt;
   said drums and said conveyor belt conjointly defining a material carrying top strand (A) and a bottom strand (B) of said conveyor belt;
   said top strand defining a first location whereat said material is deposited for conveyance thereon and a second location whereat said material is discharged therefrom; and,
   a central control for controlling said conveyor system;
   said arrangement comprising:
   a conductor loop packet including at least two sequential continuous closed conductor loops embedded in said conveyor belt and being spaced from each other by distance (X) in said longitudinal direction;
   an electronic sequential slit protection system for contactlessly detecting damage to said conveyor belt;

said electronic sequential slit protection system including an interrogation station and a slit monitoring station and said stations being connected to said central control;

said slit monitoring station being configured to supply a composite signal in the form of a combination of a first signal for an intact conductor loop and a second signal for a damaged or destroyed conductor loop;

said electronic sequential slit protection system being configured to operate to emit a warning signal when one of said conductor loops is destroyed or damaged and when at least one other one of said conductor loops is intact within said conductor loop packet; and, said warning signal being associated with measures for the next repair and inspection work when there is at least one intact continuous loop within said conductor loop packet when one of the conductor loops of said packet is destroyed or damaged while the other one of said conductor loops of said conductor loop packet is intact; whereas, said conveyor belt is brought to standstill when all of the conductor loops of said conductor loop packet are destroyed or damaged.

2. The arrangement of claim 1, wherein said conductor loop packet includes at least three sequential conductor loops with each two mutually adjacent ones of said conductor loops being spaced apart by the same said distance (X) from each other.

3. The arrangement of claim 1, wherein said distance (X) is greater than the maximum particle size ($d_{K max}$) of the material conveyed by said conveyor belt.

4. The arrangement of claim 1, wherein said conductor loop packet with said sequential continuous closed conductor loops is embedded in at least one or both of said cover plates.

5. The arrangement of claim 1, wherein said conductor loop packet with said sequential continuous closed conductor loops is reinforced with a transverse reinforcement.

6. The arrangement of claim 5, wherein said transverse reinforcement is made of a textile material.

7. The arrangement of claim 6, wherein said transverse reinforcement is a two-dimensional textile structure.

8. The arrangement of claim 7, wherein said two-dimensional textile structure is one of a woven, knitted, crocheted or nonwoven fabric.

9. The arrangement of claim 8, wherein said two-dimensional textile fabric is a woven fabric.

10. The arrangement of claim 9, wherein said woven fabric is a polyamide-polyester fabric.

11. The arrangement of claim 1, further comprising at least one proximity initiator and/or at least one transponder.

* * * * *